United States Patent [19]
Nienburg et al.

[11] 3,929,898
[45] Dec. 30, 1975

[54] PRODUCTION OF MAINLY LINEAR ALDEHYDES

[75] Inventors: Hans-Juergen Nienburg, Ludwigshafen; Rudolf Kummer, Frankenthal; Heinz Hohenschutz, Mannheim; Max Strohmeyer; Peter Tavs, both of Limburgerhof, all of Germany

[73] Assignee: Badische Anilin- & Soda-Fabrik Aktiengesellschaft, Ludwigshafen (Rhine), Germany

[22] Filed: Aug. 1, 1972

[21] Appl. No.: 276,936

[30] Foreign Application Priority Data
Aug. 7, 1971  Germany............................ 2139630
Feb. 10, 1972  Germany........................... 2206252

[52] U.S. Cl. .......... 260/604 HF; 260/598; 260/601; 260/599
[51] Int. Cl.² ......................................... C07C 45/08
[58] Field of Search ............................. 260/604 HF

[56] References Cited
UNITED STATES PATENTS
2,476,263  7/1949  McKeever ..................... 260/604 HF
2,647,149  7/1953  Condit et al. ................... 260/604 HF
2,747,986  5/1956  Gwynn........................... 260/604 HF
2,831,029  4/1958  Vergilio et al. ................. 260/604 HF FOREIGN PATENTS OR APPLICATIONS
702,241  1/1954  United Kingdom .......... 260/604 HF Primary Examiner—James O. Thomas, Jr.
Assistant Examiner—R. H. Liles
Attorney, Agent, or Firm—Johnston, Keil, Thompson & Shurtleff

[57] ABSTRACT

A process for the production of mainly linear aldehydes by hydroformylation of an olefinically unsaturated compound of from two to twenty carbon atoms with carbon monoxide and hydrogen at elevated temperature and superatmospheric pressure in the presence of a cobalt carbonyl complex prepared prior to the hydroformylation from an aqueous solution of a cobalt salt, wherein in a first stage an aqueous solution of a cobalt salt is treated with carbon monoxide and hydrogen at a temperature of from 50° to 200°C and at a pressure of from 100 to 400 atmospheres in the presence of activated carbon, a zeolite or a basic ion exchanger which has been loaded with cobalt carbonyl, the aqueous solution containing cobalt salt and cobalt carbonyl hydride thus obtained and the mixture of carbon monoxide and hydrogen, without releasing the pressure, are extracted at a temperature of 20° to 100°C and at a pressure of 100 to 400 atmospheres in a second stage with a saturated hydrocarbon or the olefinically unsaturated compound used for the hydroformylation (provided they are insoluble in water and liquid under the conditions used), water-insoluble oxo reaction product or hydrogenated oxo reaction product, the aqueous phase is separated and the organic phase containing the carbonyl complex thus obtained and the mixture of carbon monoxide and hydrogen are transferred to a third stage and, after supplying olefinically unsaturated compound (if this has not been used or has only partly been used for extraction in the abovementioned stage) hydroformylation is carried out at a temperature of from 70° to 170°C and a pressure of from 100 to 400 atmospheres.

The products of the process are suitable for the production of detergent alcohols and plasticizers and for the production of carboxylic acids and amines.

10 Claims, No Drawings

PRODUCTION OF MAINLY LINEAR ALDEHYDES

This invention relates to a process for the production of mainly linear aldehydes by hydroformylation of olefins.

A method for the production of aldehydes which has been generally adopted by industry is the hydroformylation of olefins with carbon monoxide and hydrogen in the presence of cobalt carbonyl catalysts. Usually the catalytically active metal is added in the form of a salt, for example as aqueous cobalt acetate solution, to the oxo synthesis. The catalytically active cobalt carbonyl complex then forms during the oxo synthesis under the reaction conditions. In hydroformylation however significant amounts of branched aldehydes are formed and these are undesirable. Attempts have therefore been made so to direct the hydroformylation of olefins using cobalt carbonyl complexes which have been modified with tertiary organic phosphines (cf. German Printed Application No. 1,186,455) that mainly linear oxo reaction products are formed. This method has the disadvantage however that the phosphines used are rapidly inactivated by traces of oxygen which are difficult to exclude. Moreover the said method has the disadvantage that the catalysts modified with phosphines can only be recovered for reuse with great expenditure, some of the catalyst material being lost. For these reasons the said method has not been adopted by industry although it has been known for a long time.

Another problem in the use of aqueous cobalt salt solutions lies in the fact that a two-phase system is present in the hydroformylation, so that the actually active cobalt carbonyl hydride does not form at a sufficient rate and therefore an inhibition has to be overcome. It is known (cf. German Patent Specification No. 946,621) that difficulties in the hydroformylation of olefins with aqueous cobalt salt solutions resulting from the presence of two phases can be avoided by using a high pressure tube filled with packing into which the aqueous cobalt salt solution enters at the top and the synthesis gas and liquid olefin enter at the bottom, while provision is made by withdrawing aqueous catalyst solution at the bottom of the reactor that the aqueous phase does not accumulate at the lower end of the reactor. The method has the disadvantage that a fairly high temperature is required to produce adequate amounts of cobalt carbonyl hydride. Another known method (cf. German Patent Specification No. 948,150) using aqueous cobalt salt solutions consists in the precarbonylation of aqueous cobalt salt solutions at high temperature in the presence of an olefin, separation of the aqueous solution and hydroformylation of the olefin containing cobalt carbonyl at 180°C. Apart from the fact that the abovementioned disadvantages in the first stage are not removed, the method has the further disadvantage that sufficient cobalt carbonyl does not accumulate in the olefin. This has the consequence that the hydroformylation has to be carried out at higher temperatures.

It is an object of the invention to provide a process in which mainly linear aldehydes are obtained without using oxidizable and difficultly regeneratable phosphine complexes. It is also an object of the invention to provide a process in which the formation of alcohols is suppressed and almost exclusively aldehydes are obtained. A further object of the invention is to provide a process in which the aqueous cobalt salt solution recovered can be used direct for the production of the catalyst without any pretreatment, for example concentration. Finally it is an object of the invention to provide a process in which the amount of cobalt carbonyl hydride supplied to the oxo reaction can be controlled in a simple manner without increased amounts of solvent having to be supplied to the hydroformylation stage.

In accordance with this invention these and other objects are achieved in a process for the production of mainly linear aldehydes by hydroformylation of an olefinically unsaturated compound of from two to twenty carbon atoms with carbon monoxide and hydrogen at elevated temperature and superatmospheric pressure in the presence of a cobalt carbonyl complex prepared prior to the hydroformylation from an aqueous solution of a cobalt salt, wherein in a first stage an aqueous solution of a cobalt salt is treated with carbon monoxide and hydrogen at a temperature of from 50° to 200°C and at a pressure of from 100 to 400 atmospheres in the presence of activated carbon, a zeolite or a basic ion exchanger which has been loaded with cobalt carbonyl, the aqueous solution containing cobalt salt and cobalt carbonyl hydride thus obtained and the mixture of carbon monoxide and hydrogen, without releasing the pressure, are extracted at a temperature of 20° to 100°C and at a pressure of 100 to 400 atmospheres in a second stage with a saturated hydrocarbon or the olefinically unsaturated compound used for the hydroformylation, provided it is insoluble in water and liquid under the conditions used, or a water-insoluble oxo reaction product or hydrogenated oxo reaction product, the aqueous phase is separated and the organic phase containing the carbonyl complex thus obtained and the mixture of carbon monoxide and hydrogen are transferred to a third stage and, after supplying olefinically unsaturated compound, if this has not been used or has only partly been used for extraction in the abovementioned stage, hydroformylation is carried out at a temperature of from 70° to 170°C and a pressure of from 100 to 400 atmospheres.

In a first stage aqueous cobalt salt solution is treated with carbon monoxide and hydrogen at a temperature of 50° to 200°C and a pressure of from 100 to 400 atmospheres in the presence of an activated carbon, a zeolite or a basic ion exchanger. It is preferred to use, as the cobalt salt, a fatty acid salt which is soluble in water, particularly a formate, acetate, propionate or butyrate. Cobalt formate and cobalt acetate have proved to be particularly suitable. It is preferred to use solutions containing from 0.5 to 3% by weight of cobalt calculated as metal, particularly from 1 to 2% by weight of cobalt in the form of the said salts. The said gas mixture generally contains carbon monoxide and hydrogen in a volumetric ratio of from 4:1 to 1:4, particularly in a volumetric ratio of from 2:1 to 1:2. It is advantageous to use the mixture of carbon monoxide and hydrogen in excess, for example of up to five times the stoichiometric amount. It is possible to introduce into the first stage the whole of the amount of carbon dioxide and hydrogen necessary for the hydroformylation or a portion thereof, for example from 50 to 80% of the amount necessary for the hydroformylation.

The treatment in the first stage is carried out in the presence of an activated carbon, a zeolite or a basic ion exchanger. Suitable types of activated carbon are for example peat carbon, animal charcoal or charcoal from sugar. Peat charcoal is particularly suitable. Preferred basic ion exchangers are those which contain primary, secondary or tertiary amino groups. Ion exchangers based on polystyrene which contain tertiary amino groups or quaternary amino groups in the basic form have acquired special importance. Particularly suitable are basic ion exchangers which are of weak to strong basicity, for example Amberlit IR45 and Dowex 4. Macroreticular types such as Amberlyst A 21, Lewatit MP 62, Lewatit MP 64, Imac A 20, Cerolit G, Amberlit IRA 93, Amberlyst A 26 are of particular industrial significance. The activated carbon, zeolite or basic ion exchanger is preferably loaded with cobalt carbonyl until it is saturated. This is generally achieved by passing aqueous solutions of cobalt salts together with the said gas mixture of carbon monoxide and hydrogen over the activated carbon, zeolite or basic ion exchanger under the specified reaction conditions until they are saturated, i.e. until cobalt carbonyl or cobalt carbonyl hydride is detected analytically in the discharge.

When activated carbon or zeolite is used, temperatures of from 100° to 160°C are particularly favorable. On the other hand it is advisable to maintain a temperature of from 100° to 120°C when using basic ion exchangers. Pressures of from 200 to 300 atmospheres have proved to be particularly advantageous.

The treatment is generally carried out in a treatment zone, which advantageously has a ratio of length to diameter of from 5:1 to 50:1. It is preferable to maintain of load of 1.5 to 50 g of metal in the form of the said salts per hour per kg of activated carbon, zeolite or basic ion exchanger.

The aqueous solution containing cobalt salts and cobalt carbonyl hydride thus obtained and the said mixture of carbon monoxide and hydrogen are supplied without releasing the pressure to a second stage and there extracted countercurrently at a temperature of from 20° to 100°C, particularly from 40° to 70°C, and at a pressure of from 100 to 400 atmospheres, particularly from 250 to 300 atmospheres, with a saturated hydrocarbon or the water-insoluble olefinically unsaturated compound used for the hydroformylation and which is liquid under the conditions used, or a water-insoluble oxo reaction product or hydrogenated oxo reaction product. The extraction is carried out for example in a simple manner in a pressure tube filled with Raschig rings, separation into an organic phase and an aqueous phase taking place at the same time. The cobalt content of the organic phase leaving the second stage is generally from 0.05 to 2% by weight, preferably from 0.1 to 0.8% by weight. Cobalt may be present in the organic phase as cobalt carbonyl, cobalt carbonyl hydride and acylocobalt tetracarbonyl.

It has proved to be particularly advantageous to use for the extraction of the catalyst not only the olefin but also the less desired iso components obtained as by-products or the higher boiling byproducts.

Saturated hydrocarbons suitable for the extraction are for example paraffins of three to twenty carbon atoms such as propane, butanes or $C_8$ to $C_{10}$, $C_{10}$ to $C_{12}$ or $C_{16}$ to $C_{18}$ distillation cuts, cycloalkanes of six to twelve carbon atoms, particularly cyclohexane, and aromatic hydrocarbons of six to eight carbon atoms such as benzene, toluene, xylenes or ethylbenzene.

Preferred oxo reaction products are water-insoluble aldehydes or mixtures of aldehydes and alkanols of four to twenty carbon atoms such as are obtained in the hydroformylation. Preferred hydrogenated oxo reaction products are water-insoluble alkanols of four to twenty carbon atoms or their distillation residues which are obtained after distilling off the said alkanols. They contain substantially the said alkanols and their acetals and esters with fatty acids.

The olefinically unsaturated compounds used for the hydroformylation which are mentioned below are also suitable for the extraction provided they are insoluble in water and are liquid under the conditions used. In the hydroformylation of olefins of three to twenty carbon atoms it has proved to be particularly advantageous to use these for the extraction. It is possible to use for the extraction only a portion of them, for example from 20 to 100% of the amount used for the hydroformylation.

Aliphatic, cycloaliphatic or araliphatic olefinically unsaturated compounds of up to twenty carbon atoms are preferably used as starting materials for the hydroformylation. The preferred olefinically unsaturated compounds may contain more than one double bond, for example two non-conjugated double bonds or substituents which are inert under the reaction conditions such as hydroxyl groups, alkoxy groups of one to four carbon atoms, carboxyl groups or carbalkoxy groups of two to nine carbon atoms, and also acyloxy groups derived from fatty acids, cycloalkanoic acids or aromatic acids as substituents.

Olefins of two to twenty carbon atoms, particularly linear olefins having terminal double bonds, are especially preferred.

Examples of suitable olefinically unsaturated compounds are propylene, hexene-1, octene-1, decene-1, α-olefin mixtures such as are obtained in the cracking of waxes or in the polymerization of ethylene, and also ethylene, cyclohexene, styrene, oleic acid, butyl acrylate or allyl butyl ether, and pentene-(4)-carboxylic acid-(1).

A particularly advantageous procedure is separating the aqueous solution containing the cobalt salt and cobalt carbonyl hydride obtained in the first stage from the mixture of carbon monoxide and hydrogen and extracting in the second stage at a temperature of from 20° to 60°C at atmospheric pressure or superatmospheric pressure while using carbon monoxide or a gas rich in carbon monoxide with olefinically unsaturated compounds which are liquid under the extraction conditions and are present in water-insoluble form.

The last-mentioned method is carried out as follows.

The aqueous solution containing cobalt salt and cobalt carbonyl hydride obtained in the first stage is separated from the mixture of carbon monoxide and hydrogen. This may be carried out already in the first stage or by a conventional method, for example in a high pressure separator. The mixture of carbon monoxide, hydrogen and small amounts of cobalt carbonyl hydride coming from the first stage is conveniently supplied to the hydroformylation reactor (stage 3). The said aqueous solution is supplied alone to the second stage and there extracted at a temperature of from 20° to 60°C at atmospheric or superatmospheric pressure of for example up to 100 atmospheres with an olefinically unsaturated compound in water-insoluble form which is liquid under the conditions used.

Examples of suitable olefinically unsaturated compounds are olefins of two to twenty carbon atoms and also $C_1$ to $C_4$ alkyl esters of unsaturated fatty acids of three to eighteen carbon atoms, also unsaturated fatty acids and nitriles or vinyl and allyl esters of fatty acids of two to eight carbon atoms. Suitable extraction agents are for example pentene, hexene, octene, $C_8$ to $C_{10}$ olefin cuts, $C_{11}$ to $C_{14}$ olefin cuts, ethyl acrylate, butyl acrylate, ethyl crotonate, vinyl propionate, allyl acetate, acrylic acid and acrylonitrile.

It is also possible to mix with the olefinically unsaturated compounds up to 90% of hydrocarbons such as paraffins, cycloparaffins or aromatic hydrocarbons which are liquid under the reaction conditions such as benzene, toluene, xylene, cyclohexane or octane. This method is advisable if the olefinically unsaturated compounds used are water-soluble; they are thereby converted into a water-insoluble form.

Extraction is carried out using carbon monoxide or a gas containing carbon monoxide which advantageously contains at least 70% by volume of carbon monoxide as well as inert substances such as hydrogen, nitrogen or argon. It is advantageous to use 2 to 20 liters of carbon monoxide or the said gas mixture per liter of aqueous solution containing cobalt salt and cobalt carbonyl hydride to be extracted.

It is possible to carry out the extraction in any conventional equipment for carrying out extraction at atmospheric or superatmospheric pressure. For example intensely stirred mixing vessels, particularly countercurrent extraction columns filled with packing, for example Raschig rings, Pall rings or glass spheres, or equipment operating on the mixer-settler principle, are well suited to the purpose. The best results are achieved when using countercurrent extraction columns when the aqueous phase is present in the column as the continuous phase.

It is advantageous to use 0.5 to 5 liters of olefinically unsaturated compound as extraction agent per liter of aqueous solution containing cobalt salt and cobalt carbonyl hydride. The cobalt content of the organic phase leaving the second stage is generally from 0.05 to 2% by weight. It will be understood that in the extraction a separation into an organic phase and an aqueous phase is carried out. The carbon monoxide or gas rich in carbon monoxide used is advantageously also separated.

The resultant organic phase containing the cobalt carbonyl complex and the mixture of carbon monoxide and hydrogen, or the organic phase alone, is transferred into a third stage and there hydroformylated at a temperature of 70° to 170°C and at a pressure of from 100 to 400 atmospheres after supplying olefinically unsaturated compound if this has not been used or only part of the same has been used for the extraction in the previous stage. Temperatures of from 80° to 130°C and pressures of from 200 to 300 atmospheres have proved to be particularly suitable. If the whole amount of carbon monoxide and hydrogen required for the hydroformylation has not already been supplied to the first stage, the amount still required is made up in the third stage so that per mole of olefin there is available at least the stoichiometric amount of carbon monoxide and hydrogen, but preferably an excess of up to 100% molar. Naturally in the preferred embodiment of the extraction stage (stage 2) the whole amount of carbon monoxide and hydrogen has to be introduced.

The hydroformylation mixture leaving the third stage is advantageously expanded down to 1 to 10 atmospheres and treated for example at a temperature of from 80° to 160°C, preferably from 105° to 150°C, with a gas containing molecular oxygen, particularly with air, in at least a stoichiometric amount based on cobalt, and also a 0.5 to 3% by weight weak aqueous acid cobalt salt solution. It is preferred to use the aqueous phase obtained in the second stage and which still contains from 0.1 to 0.8% by weight of cobalt in the form of the salts therein specified and to mix this with cobalt salt solution from the decobalting step so that an aqueous phase is obtained having a cobalt content of from 1 to 3% by weight. A pH of preferably 3.5 to 4.5 is automatically set up by the acids present in the hydroformylation mixture. It is advantageous to use 3 to 30 liters (STP) of air and 0.5 to 2 liters of the said aqueous cobalt salt solution. It is convenient to recycle the cobalt salt solution, so that the cobalt content is enriched to 1 to 3% by weight, and then the cobalt acetate solution thus enriched is continuously withdrawn and replaced by an equal amount of the aqueous phase from the second stage. The withdrawn aqueous cobalt salt solution now enriched in cobalt salt is returned to the first stage and used there as the starting solution. The duration of the treatment is advantageously from 0.2 minute to 5 minutes. The organic phase, after the gas phase has been separated, is worked up by a conventional method, for example by distillation, or converted direct in the hydrogenation stage with the production of the corresponding alcohols.

Aldehydes which have been prepared by the process according to the invention are suitable for the production of alcohols, particularly those for detergent purposes and for plasticizers, and also for the production of carboxylic acids and amines.

The invention will be illustrated by the following Examples.

EXAMPLE 1

20 ml of an aqueous cobalt acetate solution containing 2% by weight of cobalt is metered per hour into the bottom of a high pressure tube having a capacity of 0.5 liter and a diameter of 30 mm which is filled with 180 g of peat charcoal AKT IV, particle size range 3.4 to 4.5 mm. 120 liters of an equimolar mixture of carbon monoxide and hydrogen is also passed in. A temperature of 140°C and pressure of 280 atmospheres gauge are maintained. The solution leaving at the top contains 0.4% by weight of divalent cobalt and 1.6% of cobalt as cobalt carbonyl hydride. This solution together with the effluent mixture of carbon monoxide and hydrogen is passed into the top of a second high pressure tube having a capacity of 0.3 liter and a diameter of 30 mm which is filled with Raschig rings, 80 ml of octene-1 (about 1.3% of octane) is supplied per hour at the bottom. The extraction is carried out at room temperature and a pressure of 280 atmospheres gauge. The octene leaving the extraction zone at the top contains 0.46% by weight of cobalt as cobalt carbonyl complex. This, together with the gas phase, is passed into a high pressure tube having a capacity of 0.25 liter and there the hydroformylation is carried out at 100°C and a pressure of 280 atmospheres. The reaction product obtained is treated at 100°C with 1 liter of air and 120 ml of aqueous acetic acid cobalt acetate solution containing about 1.8% by weight of cobalt in order to remove the cobalt. This aqueous cobalt salt solution is obtained by mixing the aqueous phase (20 ml) coming from the extraction (stage II) with 100 ml of a cobalt acetate solution containing 2% by weight of cobalt.

The aqueous phase which now again contains about 2% by weight of cobalt and which has been obtained from the removal of cobalt is divided; 20 ml is returned to stage (I) and about 100 ml is mixed as described above with the aqueous phase recovered from stage (II) (extraction) and used again for removal of cobalt.

The organic phase obtained from the removal of cobalt (73 g per hour with a refractive index of 1.4233) is analyzed by gas chromatography. It contains 15.5% of octene, 1.4% of octane, 17.5% of isononanal, 55.5% of n-nonanal, 2.2% of nonanols and 40% of nonyl formate. The proportion of linear hydroformylation products is 76%.

EXAMPLE 2

The procedure described in Example 1 is followed but a temperature of 50°C is maintained in the second stage. The octene thus obtained then has a cobalt content of 0.50% by weight. Moreover a temperature of 90°C is maintained in the second stage of the hydroformylation. After analogous processing a hydroformylation product is obtained having a proportion of linear compounds of 78%.

EXAMPLE 3

The procedure described in Example 1 is followed but an industrial $C_8$ to $C_{10}$ olefin mixture having a content of 78% of terminal linear and 3% of mid-position linear olefins is used. The organic phase leaving the extractor contains 0.48% by weight of cobalt. A temperature of 100°C is maintained in stage (III). After analogous processing a hydroformylation product is obtained having a normal proportion of 71.2%.

EXAMPLE 4

The procedure described in Example 2 is followed but an industrial $C_8$ to $C_{10}$ olefin mixture is used. The olefin mixture leaving the extraction stage has a cobalt content of 0.61% by weight. After otherwise analogous processing a hydroformylation product is obtained which according to gas chromatography has a normal content of 74.5%.

EXAMPLE 5

70 ml per hour of an aqueous cobalt formate solution containing 1% by weight of cobalt is metered in at the bottom of the high pressure tube described in Example 1. Moreover about 250 liters (STP) of an equimolar mixture of carbon monoxide and hydrogen is introduced. A temperature of 120°C and a pressure of 280 atmospheres are maintained. The solution leaving the reactor is passed with the gas from the top into a second high pressure tube having a capacity of 0.3 liter and a diameter of 30 mm which is filled with Raschig rings, 328 ml (about 171 g) per hour of liquid propylene is metered in at the bottom. The extraction is carried out at room temperature and 280 atmospheres. The olefin loaded with catalyst which leaves at the top is passed together with the gas phase into a high pressure tube having a capacity of 0.65 liter and the hydroformylation is carried out therein at 120°C and a pressure of 280 atmospheres. 230 g per hour of a discharge having a cobalt content of 0.22% is obtained. It is treated at 100°C and 6 atmospheres with 1.6 liters (STP) of air and 350 ml of cobalt formate solution containing 0.85% by weight of cobalt and having a pH of 3.8 in order to remove the cobalt from the organic phase. This cobalt formate solution is obtained as described in Example 1 by mixing the aqueous solution containing 0.29% by weight of cobalt coming from the stage (II) (extraction) with 280 ml of 1.0% by weight cobalt salt solution from the removal of cobalt. The residue 70 ml of aqueous cobalt formate solution from the removal of cobalt and containing 1% of cobalt is returned to stage (I).

Gas chromatographic analysis of the organic discharge devoid of cobalt gives 71.2% of n-butyraldehyde, 18.0% of isobutyraldehyde, 1.2% of butanols, 5.7% of butyl formate and 3.9% of components of higher boiling point. The normal proportion in the aldehydes formed is thus 78%.

EXAMPLE 6

The procedure of Example 5 is followed but 50 ml of isobutyraldehyde as well as 313 ml of propylene is metered into the extraction tube filled with Raschig rings (stage (II)).

260 g per hour of organic discharge is obtained having a cobalt content of 0.2% by weight. Gas chromatographic analysis of the hydroformylation product gives 60.7% by weight of n-butyraldehyde, 27.7% by weight of isobutyraldehyde, 1.5% by weight of butanols, 4.9% by weight of butyl formate and 5.2% by weight of components of higher boiling point. After deducting the aldehyde introduced into the extraction and disregarding the fact that this is also partly converted (to alcohol, residue) it may be calculated that the freshly formed butyraldehyde has a normal fraction of 83.5%.

The preferred method of carrying out the extraction corresponding to stage (II) will be illustrated in the followinng Examples.

EXAMPLE 7

400 ml per hour of an aqueous cobalt acetate solution, precarbonylated according to stage (I) and containing 0.33% by weight of cobalt (III), 0.60% by weight of cobalt as cobalt carbonyl hydride and 1200 ml of $C_8$ to $C_{10}$ olefin cut is metered into a flask, provision being made for intense mixing. The flask is provided with a lateral overflow so that the volume of the mixture is about 400 ml. A temperature of 50°C is maintained. 10 liters (STP) of carbon monoxide is passed per hour through the contents of the flask. The mixture leaving the flask separates into two phases in a dwell tank. The organic phase is separated and contains 0.24% by weight of cobalt as cobalt carbonyl complex, while the aqueous phase contains 0.33% by weight of cobalt(II) and 0.09% by weight of cobalt as cobalt carbonyl hydride. Thus 85% of the extractable cobalt has been extracted.

Comparative Example I

The procedure described in Example 7 is followed but an equimolar mixture of carbon monoxide and hydrogen is passed through the mixture to be extracted. After the phases have been separated, the organic phase contains 0.22% by weight of cobalt as cobalt carbonyl complex, whereas the aqueous phase contains 0.46% by weight of cobalt (II) and 0.02% by weight of cobalt as cobalt carbonyl hydride. It is noteworthly that a marked conversion of cobalt carbonyl hydride into cobalt (II) takes place.

Comparative Example II

The procedure of Example 1 is followed but petroleum ether is used for the extraction instead of the olefin cut. After the organic phase has been separated it contains 0.08% by weight of cobalt as cobalt carbonyl complex, whereas the aqueous phase contains 0.33% by weight of cobalt (II) and 0.44% by weight of cobalt as cobalt carbonyl hydride. Only 27% of the extractable cobalt is extracted.

EXAMPLE 8

400 ml per hour of aqueous cobalt acetate solution which has been precarbonylated according to stage (I) and which contains 0.30% by weight of cobalt(II) and 0.65% by weight of cobalt as cobalt carbonyl hydride, and 750 ml per hour of mixture of 9 parts by volume of benzene and 1 part by volume of methyl acrylate are pumped into the apparatus described in Example 7 and intimately mixed. After extraction and separation of the phases the aqueous phase contains 0.31% by weight of cobalt (II), cobalt carbonyl hydride not being detectable, whereas the organic phase contains 0.34% by weight of cobalt in the form of cobalt carbonyl complex. The extraction proceeds practically quantitatively.

EXAMPLE 9

10 liters (STP) per hour of carbon monoxide is fed in at the bottom of a tube having a length of 80 cm and a diameter of 3 cm which is filled with glass spheres having a diameter of 3 mm and which is heated to 50°C by means of a heating jacket, while 300 ml per hour of a precarbonylated aqueous cobalt acetate solution (which contains 0.33% by weight of cobalt (II) and 0.58% by weight of cobalt as cobalt carbonyl hydride) is pumped continuously into the top and 900 ml per hour of octene-1 into the bottom. The octene-1 leaving the tube contains 0.26% by weight of cobalt as cobalt carbonyl complex whereas the aqueous phase contains 0.36% by weight of cobalt (II) and 0.06% by weight of cobalt as cobalt carbonyl hydride. 83% of the extractable cobalt carbonyl hydride is extracted.

We claim:

1. A process for the production of mainly linear aldehydes by hydroformylation of an olefinically unsaturated compound of from two to twenty carbon atoms with carbon monoxide and hydrogen at elevated temperature and superatmospheric pressure in the presence of a cobalt carbonyl complex prepared prior to the hydroformylation from an aqueous solution of a cobalt salt, wherein in a first stage an aqueous solution of a cobalt salt is treated with carbon monoxide and hydrogen at a temperature of from 50° to 200°C and at a pressure of from 100 to 400 atmospheres in the presence of activated carbon, a zeolite or a basic ion exchanger containing primary, secondary, tertiary or quaternary amino groups; the aqueous solution containing cobalt salt and cobalt carbonyl hydride thus obtained and the mixture of carbon monoxide and hydrogen, without releasing the pressure, are extracted at a temperature of 20° to 100°C and at a pressure of 100 to 400 atmospheres in a second stage with the olefinically unsaturated compound used for the hydroformylation, which compound is liquid under the conditions used and is insoluble in water, or with an organic solvent containing said olefinically unsaturated compound, which solvent is liquid under the conditions used and is insoluble in water; the aqueous phase is separated and the organic phase containing the carbonyl complex thus obtained and the mixture of carbon monoxide and hydrogen are transferred to a third stage; and, after supplying additional olefinically unsaturated compounds, if only a portion of the olefin to be used in the hydroformylation was used for the extraction in the second stage, hydroformylation is carried out in the third stage at a temperature of from 70° to 170°C and a pressure of from 100 to 400 atmospheres to obtain an oxo reaction product composed mainly of linear aldehydes.

2. A process as claimed in claim 1 wherein the aqueous solution containing cobalt salt and cobalt carbonyl hydride obtained in the first stage is separated from the mixture of carbon monoxide and hydrogen and is extracted in the second stage at a temperature of from 20° to 60°C at atmospheric or superatomspheric pressure, with the co-use of carbon monoxide or a gas rich in carbon monoxide, with said olefinically unsaturated compound which is liquid under the extraction conditions and is present in a water-insoluble form.

3. A process as claimed in claim 1 wherein the hydroformylation mixture leaving the third stage is treated with a mixture of the aqueous phase obtained in the second stage and a recycled acid cobalt salt solution and at least the stoichiometrically necessary amount of molecular oxygen.

4. A process as claimed in claim 1 wherein the aqueous cobalt salt solution enriched with cobalt salt obtained after treatment of the hydroformylation mixture is returned to the first stage and used therein as starting solution.

5. A process as claimed in claim 1 wherein olefins of two to twenty carbon atoms are used for the hydroformylation.

6. A process as claimed in claim 2 wherein said olefinically unsaturated compound is octene-1.

7. A process as claimed in claim 2 wherein said olefinically unsaturated compound is propylene.

8. A process as claimed in claim 2 wherein said olefinically unsaturated compound is $C_8$ to $C_{10}$ olefin cut.

9. A process as claimed in claim 1 wherein the extraction in said second stage is carried out with benzene as said organic solvent containing said olefinically unsaturated compound.

10. A process as claimed in claim 1 wherein the treatment in said first stage is continued until cobalt carbonyl or cobalt carbonyl hydride is detected analytically in the gas discharge to obtain activated carbon, zeolite or basic ion exchanger saturated with cobalt carbonyl.

* * * * *